Patented Dec. 19, 1933

1,940,159

UNITED STATES PATENT OFFICE 1,940,159

PROCESS OF PREPARING AND PACKING SEA FOOD

Julius Alsberg, Tompkins Corners, N. Y.

No Drawing. Application July 11, 1928
Serial No. 292,027

13 Claims. (Cl. 99—11)

My invention relates to improvements in methods of treating or preparing sea food, such as fish or the like, for storage and transportation, and the same has for its object more particularly to provide a simple, efficient and economical method of maintaining such food in a fresh, sweet and wholesome condition ready for immediate use upon receipt thereof by the consumer.

Further, said invention has for its object to provide a method according to which the article of food may be so treated or prepared that the same may be readily transported or distributed without liability of deterioration or decay, and thus insure its receipt by the ultimate consumer in its original, sweet and wholesome condition, and with its natural juices, proteids and flavors unimpaired.

Further, said invention has for its object to provide a method according to which the sea food is rendered sterile, and thereafter a portion of the latent heat of the product abstracted therefrom and the same caused to acquire or assume a leather-like or rubber-like condition.

Further, said invention has for its object to provide a method of treating and preparing sea food for storage or transportation which does not necessitate the freezing of the article, or the use of ice, brine, or other preservative which must be brought into direct contact with the article to be preserved, and as a result detrimentally affect the substance or quality of the article.

Further, said invention has for its object to provide a method by means of which the bacterial content of the article may be so reduced, or its development so retarded that the article may be economically transported, and its receipt by the consumer in good, wholesome condition insured.

Further, said invention has for its object to provide a method by means of which the sea food may be so treated and prepared for storage or transportation at the packing establishment that the same will require no further treatment or preparation by the ultimate consumer in order to render the same suitable for immediate cooking and consumption.

Further, said invention has for its object to provide a method by means of which the sea food may be dressed, sterilized, chilled, and enclosed in suitable dry enveloping medium to permit of the storage or transportation thereof for considerable periods of time without necessitating the use of any preserving or refrigerating mediums and still insure the receipt of the article by the ultimate consumer in a fresh, wholesome and firm condition ready for immediate cooking and consumption.

To the attainment of the aforesaid objects and ends, my invention consists in the novel process comprising the successive steps hereinafter described, and then pointed out in the claims.

It is well known that the flesh of fish is more susceptible to decomposition as a result of the action of ordinary water or other bacteria than is the flesh of the higher animals, and that if the flesh of fish can be effectively protected against the action of such bacteria, it will remain sweet and firm for long periods, and remain free from all obnoxious odors.

It is also well known that all fish food upon removal from the water, and for some period after such removal, depending largely upon the atmospheric temperature, is practically odorless, and that the offensive or fishy odor which may become apparent after the fish has been removed from the water for some time is due mainly to the action of certain oceanic and other saprophytic bacteria which act upon the tissue of the fish and cause its decomposition. Further, these bacteria whose natural habitat is the water in which the fish live, are always found in the slimy coating which envelops the fish, and in the gills, mouth and skins.

In carrying out the method constituting my said invention, the fish or other sea food is preferably obtained alive from the wells of the fish boats, from traps or weirs, or from the fish pens maintained in connection with the packing plant or establishment, or from other sources within convenient distance from said plant or establishment. It is, however, desirable that the fish be treated as soon after catching as possible. The reason for the use of ultra fresh fish is that many oceanic bacteria which occur on fish (in body slimes, gills and digestive tract) are of the boring type. It is desirable to use fish as raw material in which such bacteria have not yet had an opportunity of penetrating into the tissues,— through the skin or otherwise, since to produce filets or dressed fish as free from bacteria as possible it is desirable to start with an uncontaminated raw material. Experiments have proven that flesh of fish, which is free from bacteria and is kept under conditions which preclude reinfection, will not deteriorate appreciably even under elevated temperature conditions for considerable periods of time. To this end the raw fish as caught, especially in warm weather, should be iced to reduce the temperature to such degree where bacterial activities are suspended, or at least very much slowed down.

The raw fish, after receipt at the plant, should at once be placed in a refrigerated room maintained at about 32 to 35 degrees F. It is also desirable to ice the fish in addition, otherwise the fish are apt to become dried out and discolored, or to acquire, as termed by fisherman, a "burnt" appearance. The fish should be thoroughly washed, either by hand or machinery, with sea water or salt brine of approximately the same strength, which has been sterilized preferably by any of the well-known methods. This washing serves to remove body slimes, which harbor large quantities of bacteria, and also to remove surface dirt, blood, etc. Fresh water should not be used for this purpose as it tends to make the flesh of the dressed fish "leak" in the shipping container. If desired a mild antiseptic such as chlorine gas, sodium hypochlorite, boracic acid or other harmless antiseptic may be added to the wash water. The use of such antiseptic is not objectionable since the fish is later dressed (skin and scales removed), and again washed after dressing thereby eliminating any possibility of antiseptic material being present in the finished product, i. e. the dressed or fileted fish.

A second scrubbing operation similar to that above described may, at times, be desirable depending upon the kind and condition of fish, particularly if additional slime appears upon the surface of the fish; in such case the same should be removed before dressing operations are undertaken.

The rough fish thus treated should be kept thoroughly iced in a refrigerated room at such temperature as will permit of the very slow melting of the ice, or subjected to such other treatment as will maintain the fish moist and in good condition for dressing or butchering.

The fish as now prepared is taken to a second room maintained at ordinary or somewhat reduced temperature and dressed or butchered (scaled, skinned, boned or fileted) either by hand or machinery. The latter is preferable as the danger of reinfection with bacteria is reduced.

After the fish are fileted or dressed they are placed in flat, sterilized wire or other suitable trays without touching each other. The filets are then washed, either by dipping in a flowing stream of cold sea water or equivalent brine solution, which is preferably sterilized, or they may be subjected to streams of water, either in the form of spray or jets in order to wash the flesh free from bacteria and micro-organisms.

The dressed fish thus washed is then allowed to drain to free the same of as much as possible of the moisture remaining on the surface thereof.

The dressed fish is next dipped in a salt brine solution preferably chilled, of approximately five per cent (5%) for short periods of time varying according to the condition of the fish, but not exceeding ten to fifteen minutes.

In certain instances a somewhat stronger brine solution and a somewhat longer period of immersion may be desirable. For example, a roe fish in the spring of the year is quite flabby and lean, and would require a stronger brine solution and longer immersion. However, the solution should not be strong enough nor the period of immersion sufficiently long to cause any deep penetration of the flesh.

The foregoing treatment results in a puckering or contraction of the surface cells of the tissues which prevents moisture or fluid leakage later in the shipping or storage container. Further, it creates a condition which is more unfavorable to bacterial activity. The less surface moisture there is present the less easily the bacteria will grow. The presence of a little salt on the surface is also helpful in this respect. In connection herewith it should be noted that there are other ways and means for creating an unfavorable culture medium on the surface of the fish which are not objectionable from a nutritional standpoint.

The filets are now again drained to free the same of any excess brine, and are then surface dried as rapidly as possible in order to avoid drawing to the surface the moisture from the inside of the flesh, and to keep down weight loss as much as possible. This drying operation is an important factor in maintaining the keeping qualities of the fish. Undried fish, chilled and wrapped in parchment paper, or fish slowly dried in a chill room under conditions of natural circulation will be very wet when the package is opened upon reaching its destination after transportation during which time it is subjected to gradually rising temperature conditions. This is probably due to what is known as "chinking", i. e. the formation of ice crystals on the surface or within the cells of the tissues. On thawing the water of these crystals does not again enter the protoplasm of the cells, but comes out partly as water on the surface. This not only detracts from the appearance of the product and affects its salability, but also creates a condition favorable to the activities of any bacteria that may have, by chance, remained on the flesh after the washing operations. It also tends to make the flesh flabby.

The air used for surface drying should be thoroughly filtered or cleansed by any suitable, well-known method to free the same of all dust and suspended matter, and should not be chilled, preferably, it should be warmed somewhat in order to bring about a rapid surface drying. The result is a shriveling or coagulation of the surface cells which later on tends to prevent the fluids from reaching the surface and produce the conditions above described. Unless the air is too warm, the surface of the fish will not be heated. The moisture in evaporating, because of the high latent heat of vaporization of water may, under proper conditions actually serve to cool the fish. This drying operation may be rapidly and efficiently performed by passing the trays containing the fish through a continuous enclosed tunnel conveyer providing a cross blast of air over the top and bottom of the trays.

After drying the trays containing the fish or filets are taken into a refrigerated room where the fish is chilled as rapidly as possible. The refrigerated room should preferably be maintained at a temperature of about 28 to 30 degrees Fahr., or the same may be maintained at a much lower temperature if the fish be carefully watched and under-chilling avoided so that the same may be removed to a room of higher temperature when the fish reaches the proper condition of chill.

By subjecting fish to the treatment hereinabove described I have found, as a result of experiment, the filets will become chilled down to a condition which I call "leatherized", by which term I mean that the filet is no longer quite limp but has assumed a leather-like or rubber-like condition in which it is still flexible or pliable but not frozen hard. The degree to which the filet is "leatherized" will depend upon the length of time the same is to be kept in storage or transportation. If the filet is to be subjected to a long period of storage or transportation the same should be "leatherized" to a considerably greater degree than it would be if the same were to be kept for a comparatively short time. However, in no event should the product be refrigerated or chilled to the extent of rendering the same stiff or inflexible. I find that after treating the filet as above described, a portion of the latent heat of the fish has been abstracted. If all were abstracted the fish would actually be frozen stiff and hard. Calorimetric tests on two pieces of freshly dressed fish of equal weight taken from the same filet, the first being chilled to the point where it begins to "leatherize", and the other "leatherized" as hereindescribed, showed that the latter absorbed about twice as much heat as the former in raising the temperature from about 29 to 65 degrees Fahr. Further, thermometric tests showed that the "leatherized" specimen while absorbing latent heat did not rise in temperature, whereas the other specimen began to show an increase in temperature as soon as it began to absorb heat. Given a definite weight of fish in a well-insulated container, the "leatherized" fish will retain low temperature much longer than a fish not "leatherized".

The filets as above prepared are next wrapped in two thicknesses of parchment paper preferably sterilized and placed in insulated containers, such as double-walled corrugated straw-board boxes, the space between the walls being packed with eel grass, or similar insulating substance. The containers should be pre-chilled, and should be packed in a refrigerated room, and should be filled as nearly solidly-full as possible, and then stored, while still open, for several hours in a refrigerated room of a temperature of about 26 to 28 degrees Fahr., and thereupon sealed as nearly air tight as possible with gummed tape or other suitable sealing means.

The product prepared and packed as above described has been found to keep forty eight hours or more, and at the expiration of said period be received by the consumer in sweet-smelling condition and free from fish odor, and the flesh in surface-dry, firm cool condition with the original pink color of freshly dressed filets. When cooked the product was found to be free from the well-known fish odor usually present during the cooking of fish.

In connection with the foregoing it will, of course be understood that all utensils, machinery, and equipment used, whether coming in contact with the fish or not, should be kept scrupulously clean and sterilized at frequent intervals by the use of steam or antiseptic solutions, and similarly the refrigerated rooms in which such operations are carried on as well as the garments, and hands of the operators, should be maintained in thoroughly sterilized and sanitary conditions.

Having thus described my said invention, what I claim and desire to secure by Letters Patent is:

1. The hereindescribed method of preparing sea food and analogous products for storage and transportation which consists in rendering the product sterile; surface drying the product; subjecting the same to reduced temperature for a sufficient period of time to abstract a portion of the latent heat of the product therefrom and until the same assumes a leather-like condition, and finally packing the product in an air-excluding enclosure to protect the same from direct contact with the air, substantially as specified.

2. The hereindescribed method of preparing sea food and analogous products for storage and transportation which consists in subjecting said product to the action of a suitable medium to free the same of saprophytic and other bacteria; subjecting the product to air blast to surface-dry the same, subjecting the thus treated product to reduced temperature until a portion of its latent heat has been abstracted and until the product assumes a leather-like condition, and finally packing the product in an air-excluding, heat insulating enclosure, substantially as specified.

3. The hereindescribed method of preparing sea food and the like for storage and transportation which consists in subjecting the same to the action of a suitable antiseptic solution to remove and destroy the saprophytic and other bacteria present, surface-drying the product, then subjecting the product to a temperature approximating the freezing point, to reduce the temperature thereof until said product assumes a leather-like condition, and finally disposing the product in a closely-fitting enclosure, substantially as specified.

4. The hereindescribed method of preparing sea food and the like for storage and transportation which consists in subjecting the product to a suitable antiseptic agent to remove and destroy the saprophytic and other bacteria present, subjecting the product to air blast to surface-dry the same, next subjecting the product to a dry gaseous medium, such as air, at a temperature approximating the freezing point, to reduce the temperature of the product until the same assumes a leather-like condition, and finally disposing the product in a dry, chilled enclosure for maintaining said product in said sterile condition, and to protect the same from direct contact with the air, substantially as specified.

5. The hereindescribed method of preparing sea food which consists in taking the same, subjecting the same to the action of a suitable medium to remove the saprophytic and other bacteria therefrom, surface drying the same, reducing the temperature of the product until the same assumes a leather-like condition, and placing the product in a closely-fitting air-excluding wrapper, substantially as specified.

6. The hereindescribed method of preparing and treating sea food and the like for storage and transportation, which consists in washing the same in a brine or salt solution, dressing the same, subjecting the dressed product to the action of an antiseptic solution to destroy or remove the saprophytic and other bacteria present, subjecting the same to an air blast to surface-dry the same, subjecting the product to a gaseous medium, such as air, at a temperature approximating the freezing point to reduce the temperature thereof until the same assumes a leather-like condition, placing the product in a dry, closely-fitting wrapper to protect the same from direct contact with the air, and finally packing the wrapped product in a dry shipping container formed of heat insulating material, substantially as specified.

7. The hereindescribed method of preparing sea food which consists in separating the edible parts from inedible parts, including the slimy coating, scales, gills, skin, bones, entrails and parts upon and in which saprophytic and other bacteria may be present, subjecting the product to the action of an antiseptic solution to destroy said bacteria and cleanse said product, subjecting the product to an air blast under sterile conditions to surface-dry the same, subjecting the product to a temperature approximating the freezing point to reduce the temperature thereof until the same assumes a leather-like condition, sealing the same in a dry pre-chilled wrapper of vegetable or parchment paper or the like, and finally packing the wrapped product tightly in a closed shipping container composed of heat insulating material, substantially as specified.

8. The hereindescribed method of preparing sea food and the like for storage and transportation which consists in subjecting the same to the action of a suitable antiseptic solution to remove and destroy the saprophytic and other bacteria present, surface-drying the product, and then subjecting the product to a temperature approximating the freezing point, to reduce the temperature thereof until said product assumes a leather-like condition, substantially as specified.

9. The hereindescribed method of preparing sea food and the like for storage and transportation which consists in subjecting the product to a suitable antiseptic agent to remove and destroy the saprophytic and other bacteria present, subjecting the product to air blast to surface-dry the same, and next subjecting the product to a dry gaseous medium, such as air, at a temperature approximating the freezing point, to reduce the temperature of the product until the same assumes a leather-like condition, substantially as specified.

10. The hereindescribed method of preparing and treating sea food and the like for storage and transportation, which consists in washing the same in a brine or salt solution, dressing the same, subjecting the dressed product to the action of an antiseptic solution to destroy or remove the saprophytic and other bacteria present, subjecting the same to an air blast to surface-dry the same, and subjecting the product to a gaseous medium, such as air, at a temperature approximating the freezing point to reduce the temperature thereof until the same assumes a leather-like condition, substantially as specified.

11. The hereindescribed method of preparing sea food which consists in separating the edible parts from inedible parts, including the slimy coating, scales, gills, skin, bones, entrails and parts upon and in which saprophytic and other bacteria may be present, subjecting the product to the action of an antiseptic solution to destroy said bacteria and cleanse said product, subjecting the product to an air blast under sterile conditions to surface-dry the same, and subjecting the product to a temperature approximating the freezing point to reduce the temperature thereof until the same assumes a leather-like condition, substantially as specified.

12. The hereindescribed method of preparing and treating sea food and the like for storage and transportation which consists in washing the same in a brine or salt solution and subjecting the same to sterilization, surface drying the product without appreciably heating the same, and subjecting the product to air cooling at a temperature approximating the freezing point to reduce the temperature thereof until the same assumes a leather-like condition, substantially as specified.

13. The hereindescribed method of preparing and treating sea food and the like for storage and transportation which consists in washing the same while cool in a brine or salt solution, subjecting the product to surface drying without appreciably increasing the temperature thereof, subjecting the product to a gaseous medium, such as air, at a temperature approximating the freezing point to reduce the temperature of the product until the same assumes a leather-like condition, and sealing the product to prevent contamination and to retain the same in leather-like condition for a prolonged period, substantially as specified.

JULIUS ALSBERG.